Nov. 19, 1968   C. GUIDO ET AL   3,411,281
DEVICE FOR INDICATING BROKEN THREADS IN SPINNING MACHINES
Filed Jan. 17, 1966   15 Sheets-Sheet 11
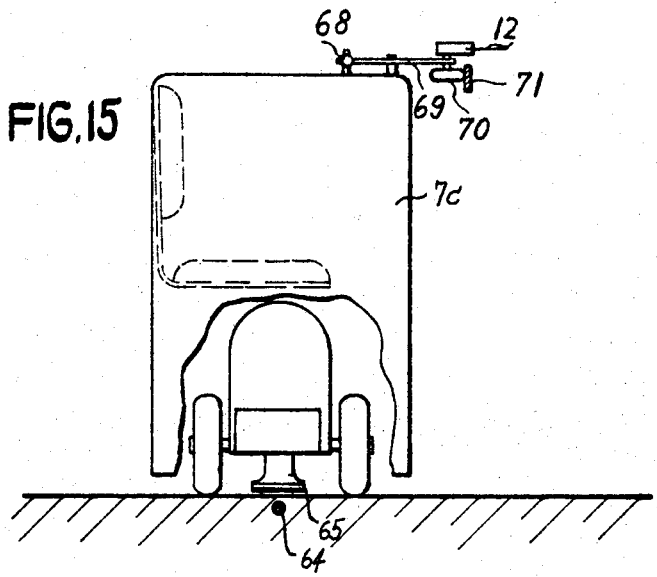
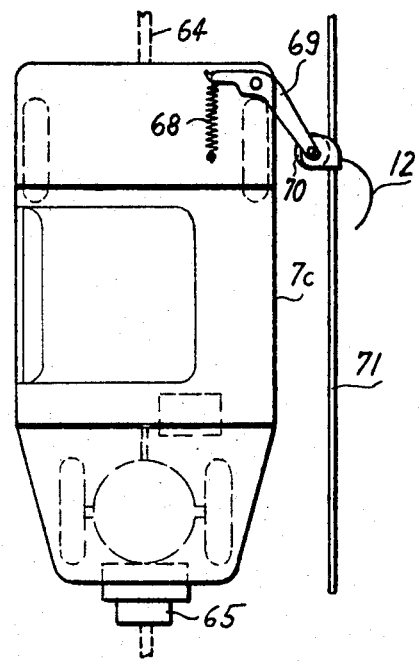
INVENTORS
CARLO GUIDO
BY FRANCESCO FOGLIO PARA
Woodhams, Blanchard & Flynn
ATTORNEYS Nov. 19, 1968 C. GUIDO ET AL 3,411,281
DEVICE FOR INDICATING BROKEN THREADS IN SPINNING MACHINES
Filed Jan. 17, 1966 15 Sheets-Sheet 12
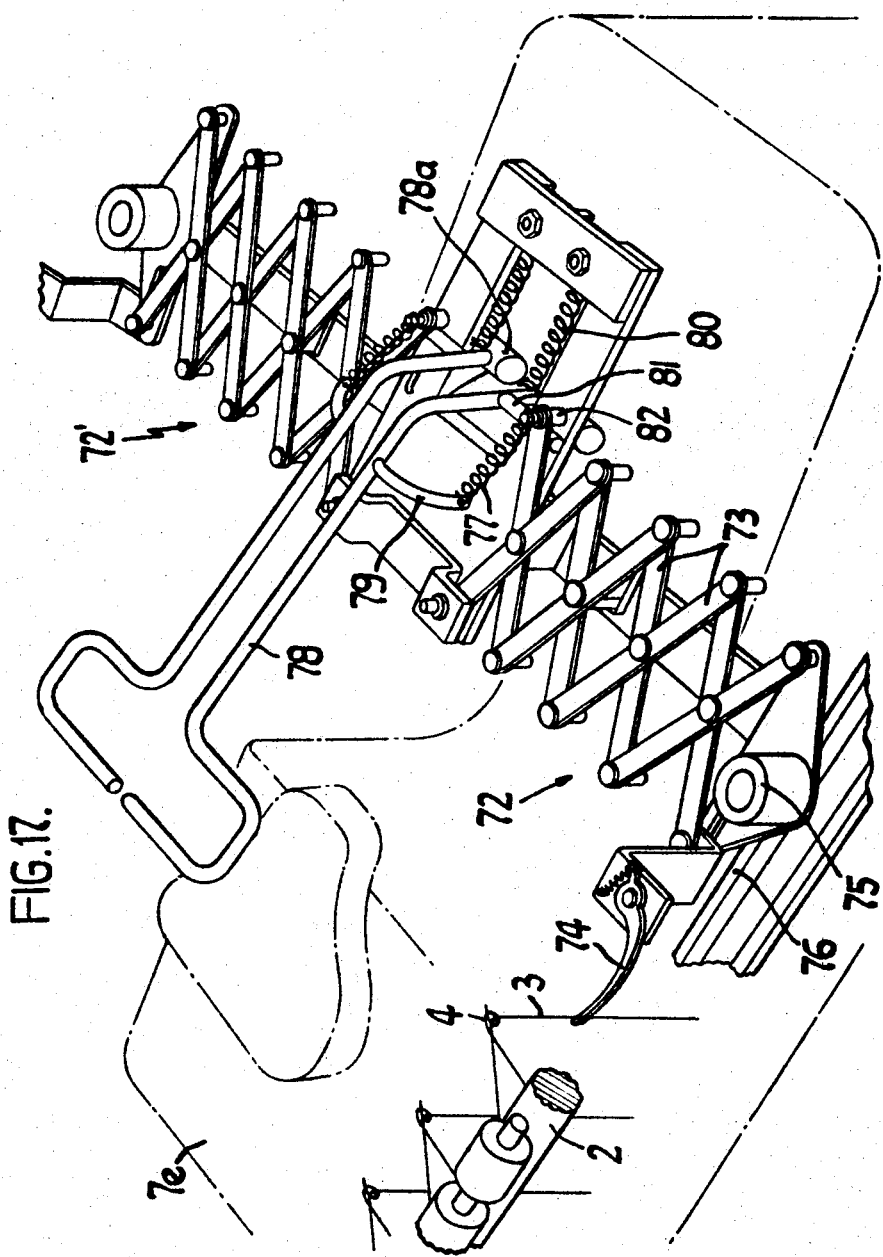
INVENTORS
CARLO GUIDO
BY FRANCESCO FOGLIO PARA
Woodhams, Blanchard & Flynn
ATTORNEYS

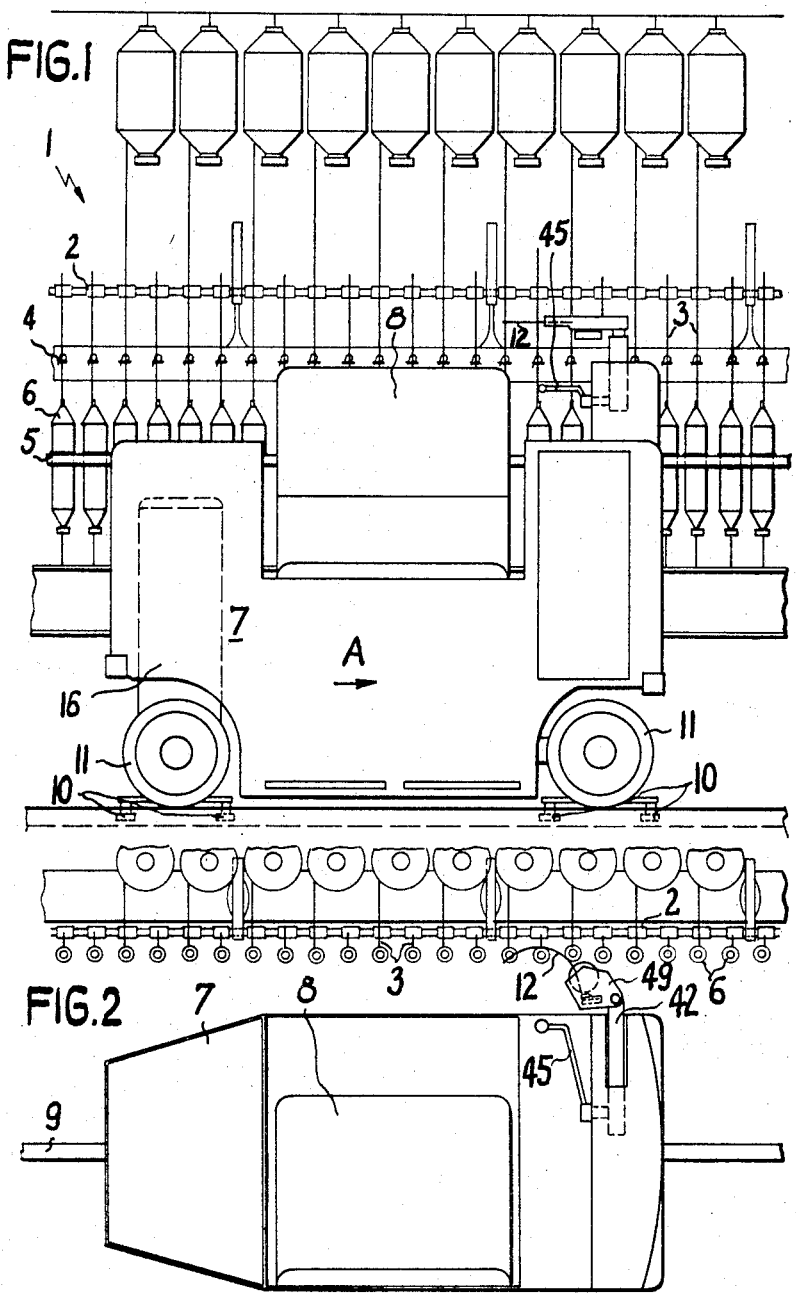

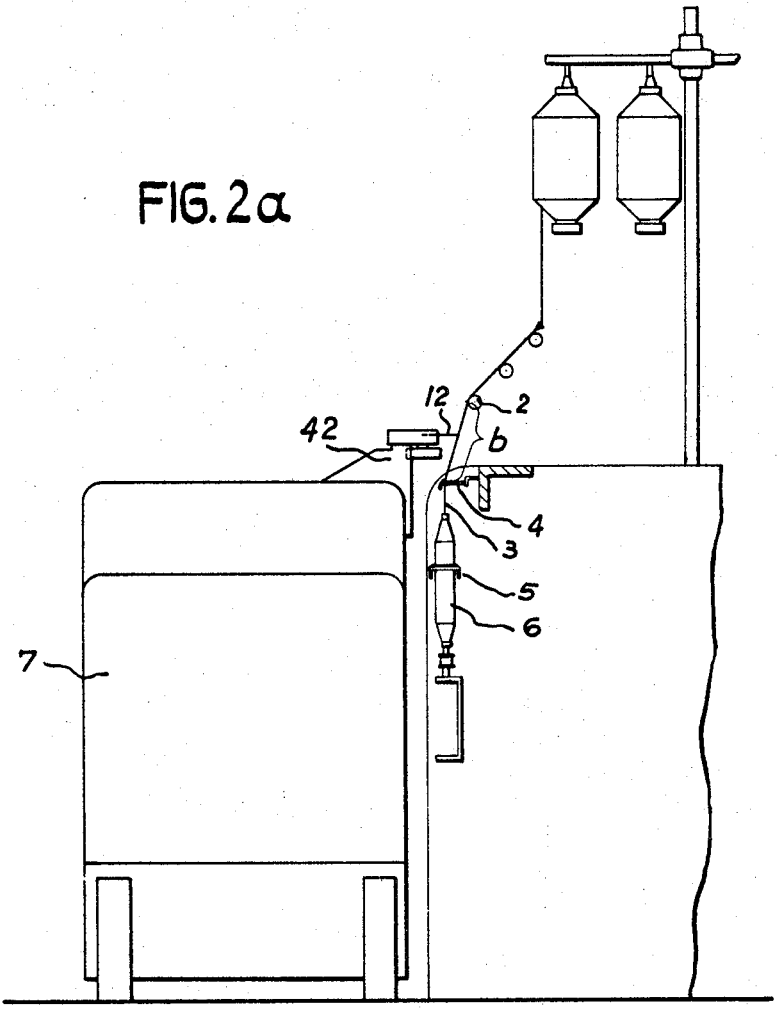

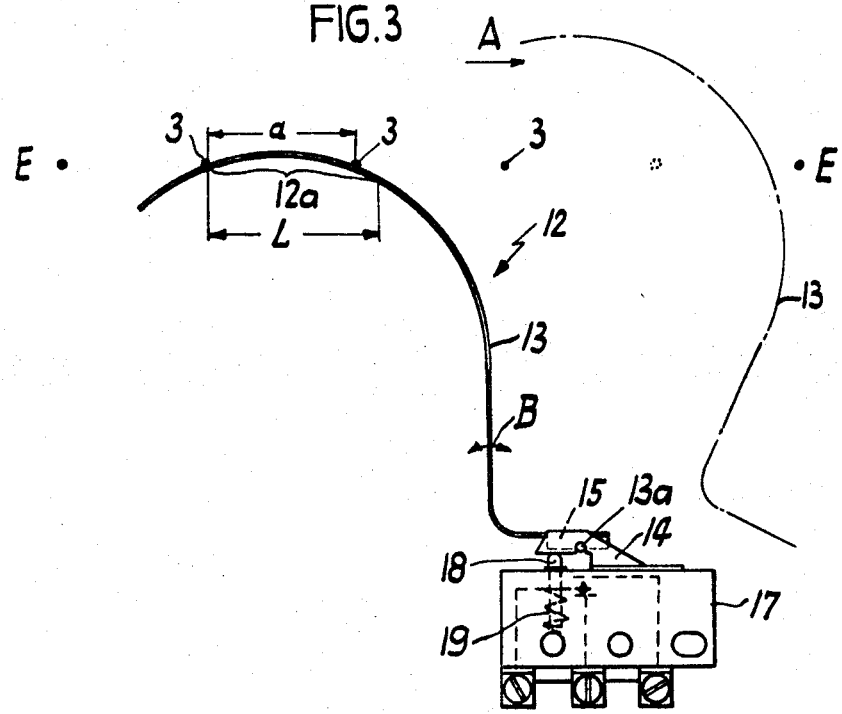
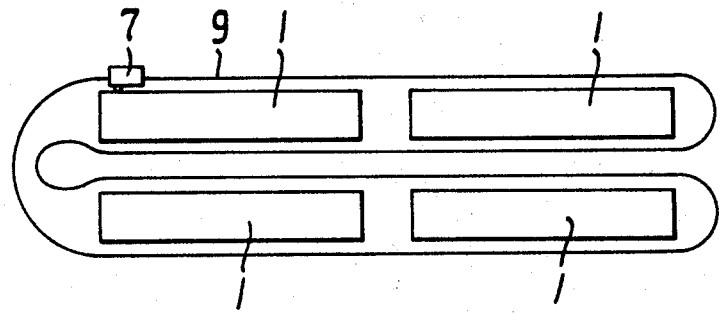

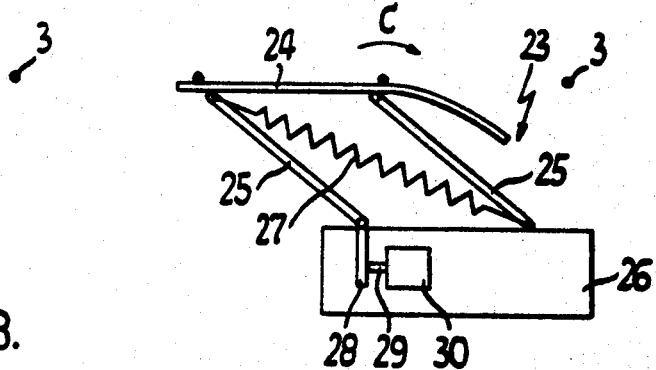
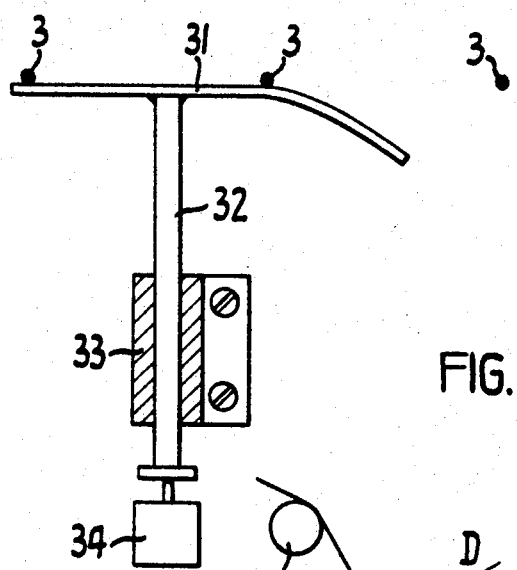
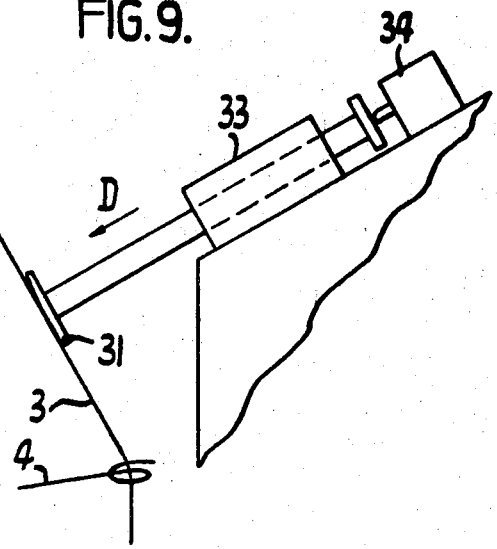

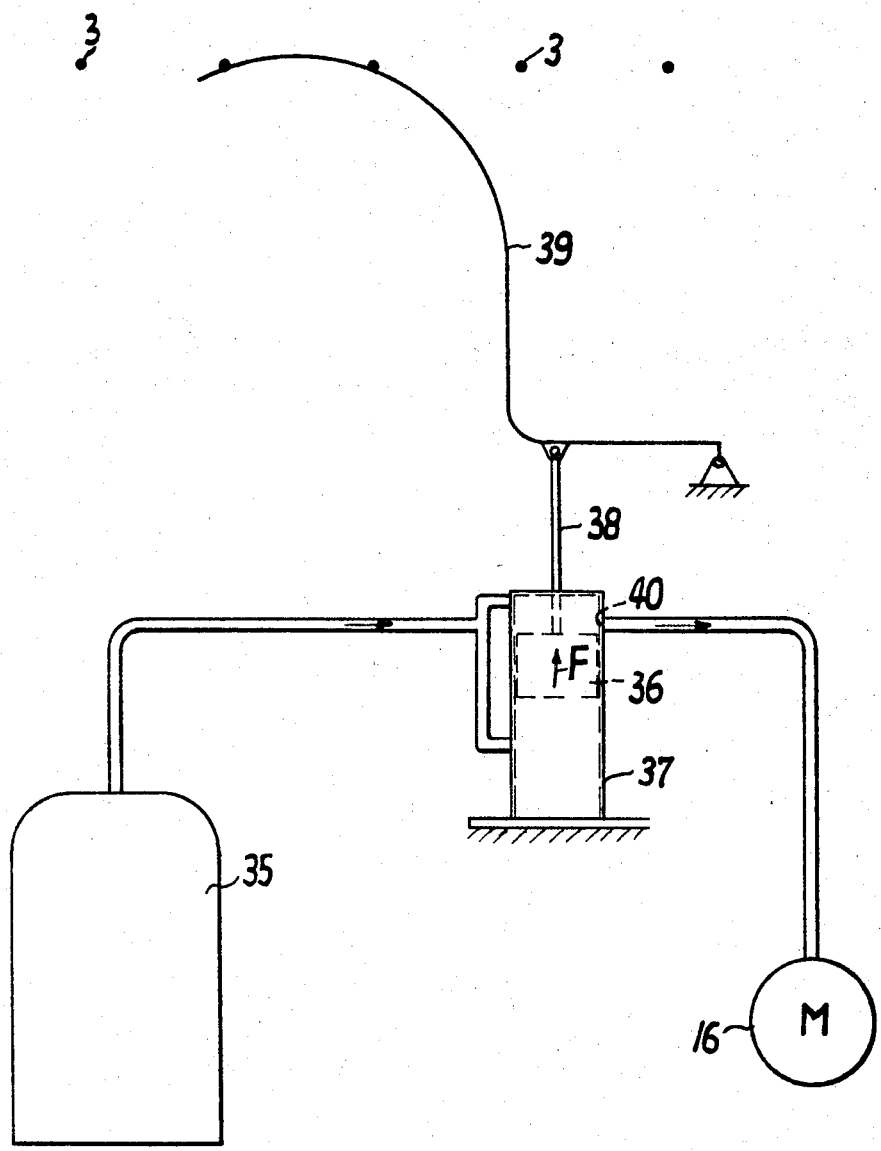

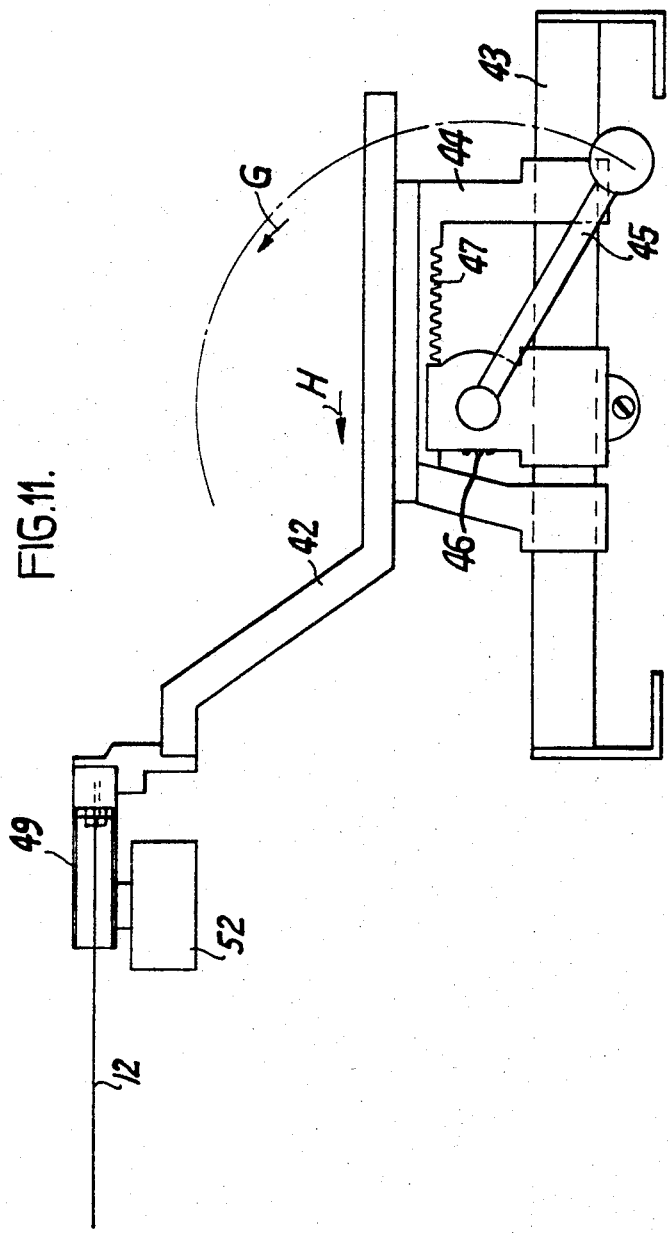

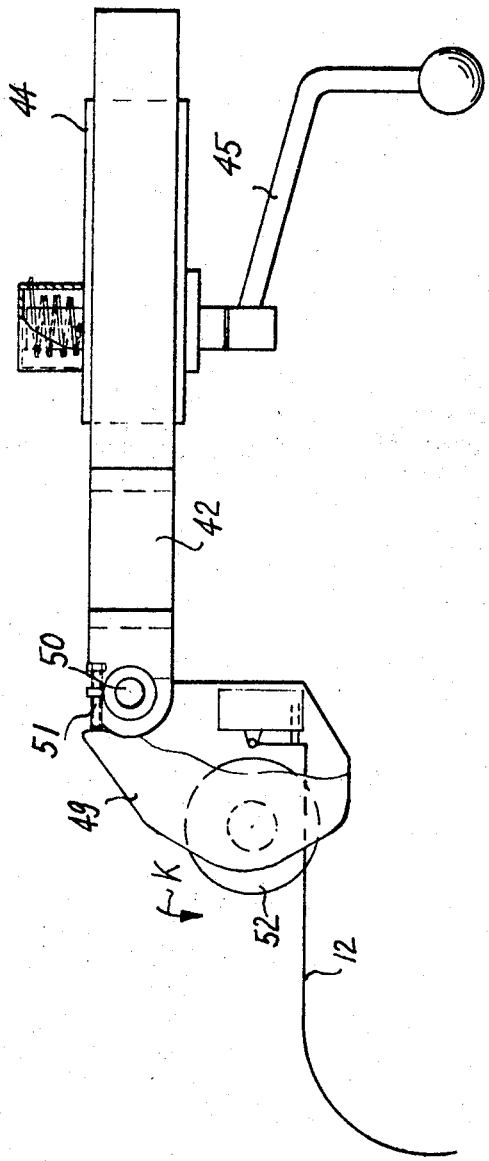

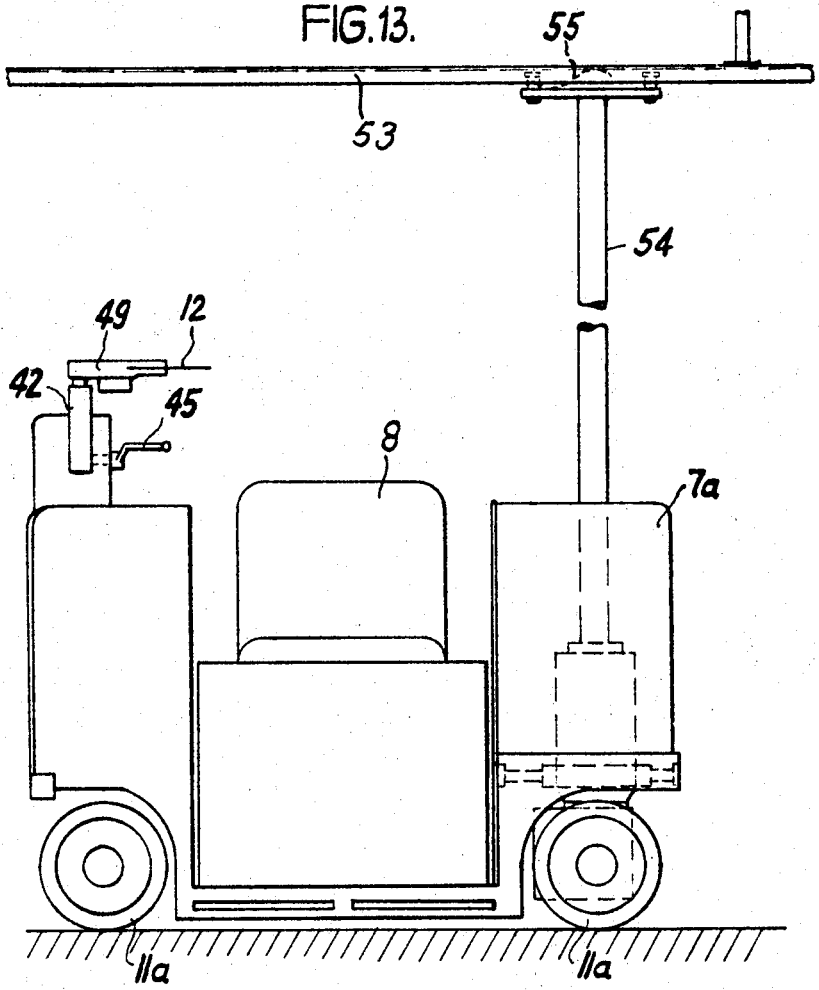

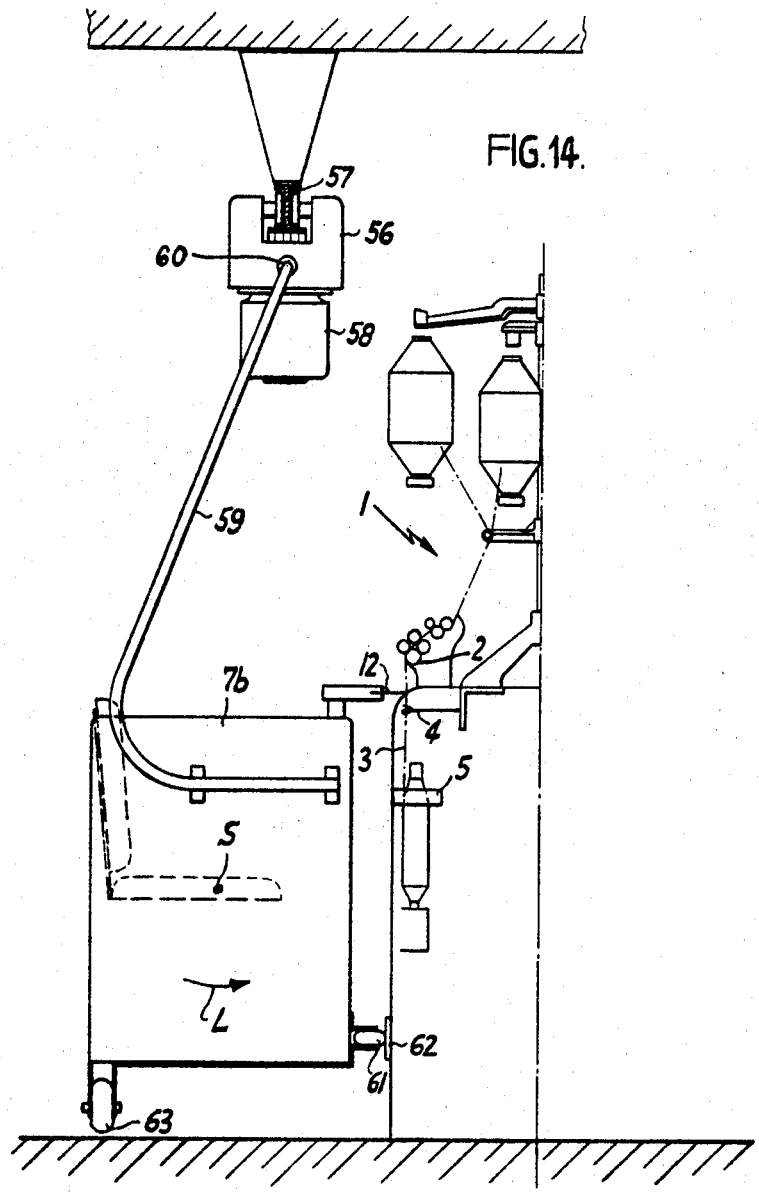

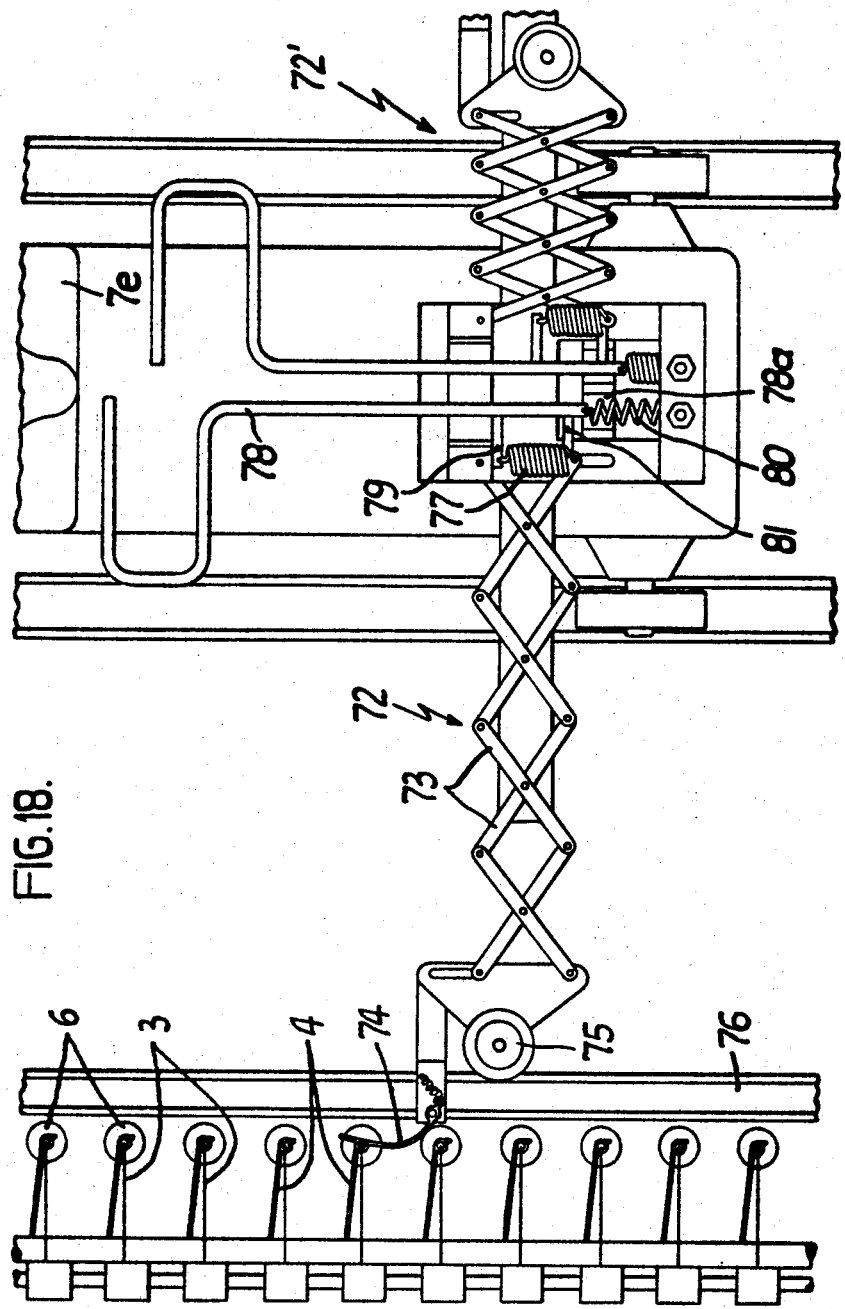

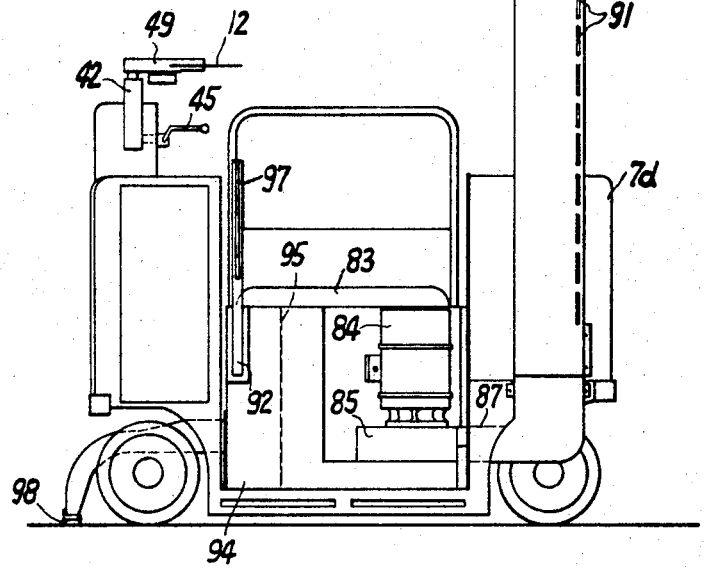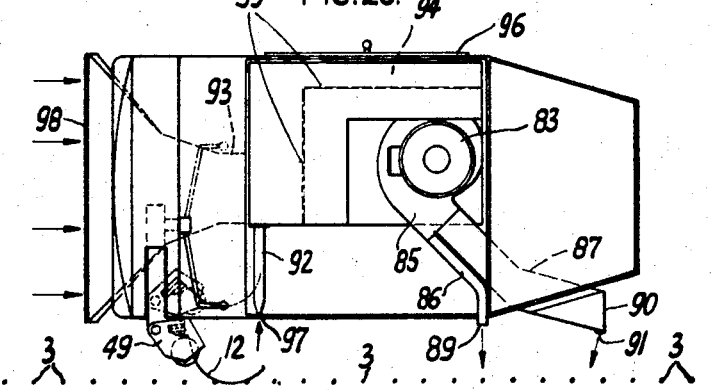

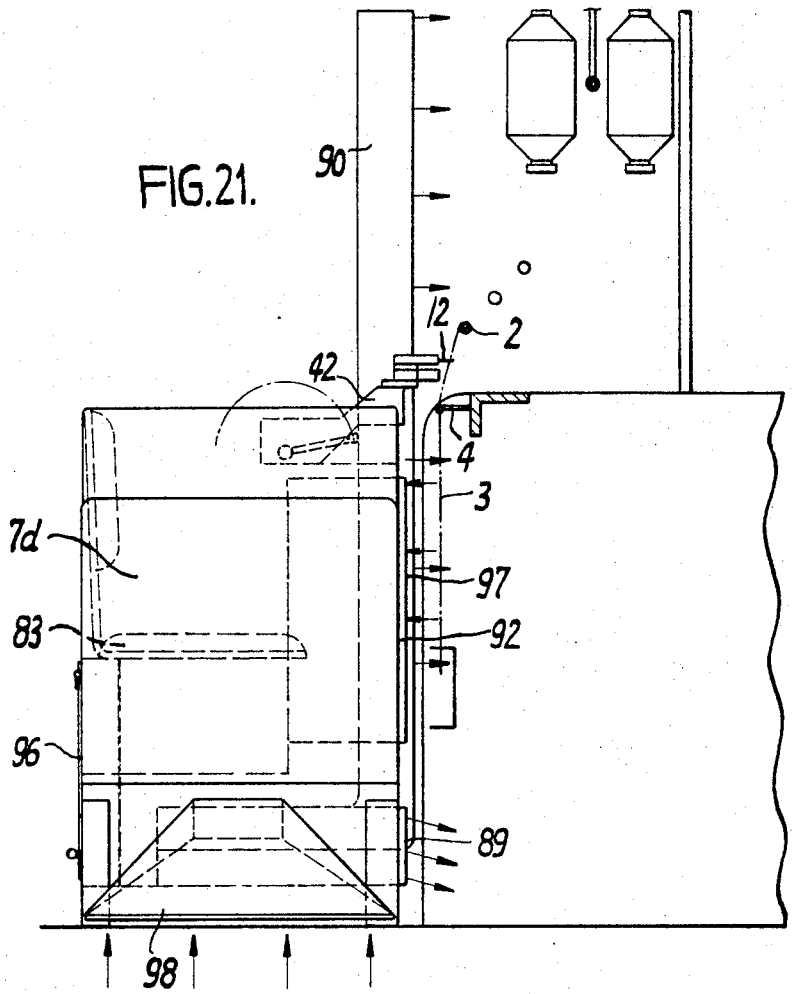

United States Patent Office 3,411,281
Patented Nov. 19, 1968

3,411,281
DEVICE FOR INDICATING BROKEN THREADS IN SPINNING MACHINES
Carlo Guido and Francesco Foglio Para, both of 21 Via Faletti, Biella, Italy
Continuation-in-part of application Ser. No. 463,178, June 11, 1965. This application Jan. 17, 1966, Ser. No. 521,136
16 Claims. (Cl. 57—34)

ABSTRACT OF THE DISCLOSURE

A sensing device for indicating broken threads in textile machines, the device comprising a motor-driven carriage which travels alongside the machine and carries an operator thereon. A sensing device is mounted on the carriage for movement in a direction substantially perpendicular to the thread path, the sensing device being continuously urged against the thread path in a direction outwardly of the carriage. A control device permits current to flow to the carriage motor to drive the carriage as long as the sensing device is in an operating position wherein it bears against the threads. If the sensing device locates a broken thread, the device moves forwardly into a non-operating position and actuates the control device to stop the carriage adjacent the broken thread.

---

This application is a continuation-in-part of our application entitled Device for Indicating Broken Threads in Spinning Machines, Ser. No. 463,178, filed June 11, 1965, now abandoned.

The invention relates to a device for indicating broken threads in textile machines, especially in spinning machines in which the threads from spindles are arranged side by side and travel in a common plane over a part of their path from the creel to the spinning location.

Known devices for indicating thread breaking in spinning machines utilize a thread feeler which switches on a warning lamp in case of a broken thread. These kinds of indicating devices, however, are expensive and easily broken, since for each thread, that is, for each spinning position, a feeler has to be provided. If the warning lamp indicates a broken thread, the operator must go to the place of breakage, which requires a considerable amount of time for large machines and which tires out the operator. Furthermore, such a device does not guarantee that broken threads in different areas of the machine are repaired, replaced or removed (hereinafter referred to as "cleared") one after the other in regular cycle. The known device with feelers for each thread can easily break down because vibrations of the machine lead to frequent breakage of lamp filaments. A breakage of a lamp filament means that the broken thread is no longer indicated.

The object of this invention is to simplify the structure of indicating devices in textile machines, especially in spinning machines, and to provide such devices which are of simple construction and which are reliable in operation. A further object of this invention is to make the work easier for the operator and to guarantee a clearing of the broken threads in a regular cycle.

For accomplishing these objects, the device according to this invention is characterized in that a motor driven carriage travels alongside the machine at a nearly uniform distance and carries an operator, a feeler is mounted to the carriage essentially perpendicular with respect to the thread path, said feeler is abutted against each thread by means of own weight and/or an auxiliary force and is held on the thread path in its operating position by means of the thread tension. In a control device working together with the feeler and controlling the motor, the control device permits current to flow to the motor as long as the feeler is in the operating position. If the feeler hits a broken thread during movement of the carriage, the motor is stopped and, consequently, comes to its non-operating position by means of own weight and/or an auxiliary force across the thread path by moving into the space provided by the broken thread. The basic thought of the invention is not to use a plurality of single, stationary feelers but one single feeler positioned on a carriage which moves along the side of the machine; said feeler feels the threads one after the other and stops the carriage in case of a thread breakage. The operator, sitting on the carriage, automatically is driven to the broken thread so that he does not need to walk. Furthermore, the operator does not have to pay attention to which thread is broken because the feeler automatically stops the carriage by means of a control device coupled with the feeler. After the broken thread or other break downs have been cleared, the carriage automatically drives on until it is stopped automatically at the next breakage. Thus, the broken threads are repaired in a regular cycle. Since only one feeler is provided on the inventive device, it is cheaper to manufacture and, furthermore, less apt to break down. The rate of work of the operator is essentially higher so that one operator can work on several machines or spindles. At the same time each single thread is checked regularly so that a broken thread is noticed faster and is cleared more quickly and results in reduced losses. Production is increased by a speedy repair of the broken threads.

Advantageously, the carriage can be provided with blast nozzles directed toward the machine and the floor and with suction nozzles arranged at least near the floor which are connected by interposition of a filter to a common blower. In this way, not only the threads are controlled but the machine is cleaned regularly.

Further advantages and details of the invention are described hereinafter in connection with a spinning machine by means of several examples of construction shown in the drawings in which:

FIGURE 1 is a front elevational view of the device in front of the spinning machine.
FIGURE 2 is a top view of the device.
FIGURE 2a is a side elevational view of the device.
FIGURE 3 is a top view of a feeler.
FIGURE 4 is a view of one example of the path followed by the carriage around four spinning machines.
FIGURE 5 is a side elevational view of a second example of construction of the feeler.
FIGURE 6 is a top view of the second example of construction.
FIGURE 7 is a top view of the third example of construction of the feeler.
FIGURE 8 is a top view of a fourth example of construction of the feeler.
FIGURE 9 is a side elevational view of the fourth example of construction.
FIGURE 10 is a further example of construction of a feeler used with a control device arranged thereto.
FIGURE 11 is a side elevational view of the details of a feeler being fixed to an arm.
FIGURE 12 is a top view of a feeler fixed to an arm.
FIGURE 13 shows a guiding device for the carriage having a guide rail arranged above the carriage.
FIGURE 14 shows a second example of construction of the guiding device.
FIGURE 15 is a front elevational view and a partial cross-sectional view of a carriage to which power is provided by a current-carrying cable laid in the ground.

FIGURE 16 is a top view of the carriage as seen in FIGURE 15.

FIGURE 17 is a graphical view of a further example of construction of a carriage having elements movable toward the machine carrying the feelers.

FIGURE 18 is a top view of the carriage shown in FIGURE 17.

FIGURE 19 is a side elevational view of a carriage being provided with a blast and suction device.

FIGURE 20 is a top view of the carriage shown in FIGURE 19.

FIGURE 21 is a front elevational view of the carriage shown in FIGURE 19.

Figure 5:
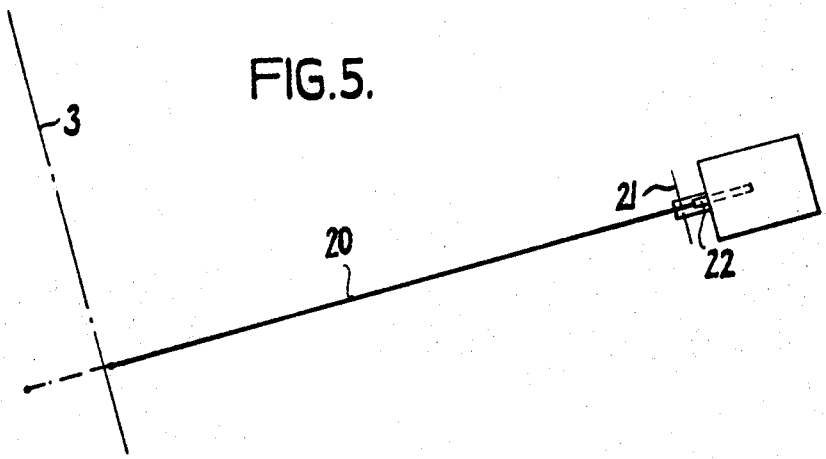

The drawing shows only the important parts of the spinning machine 1 in connection with this invention, that is, threads of which are controlled by the new device. From the cylinder 2 the threads 3 pass through the thread guide 4 to the ring rail 5 and are then wound onto the spools 6. On their path from the pulling system to the spinning position, the threads pass through at least one area where they are in one common plane and is shown as the area $b$ (FIGURE 2a) positioned between the cylinder 2 and the thread guides 4. The common plane where the threads pass in this area is indicated between the points E—E lying in the plane as shown in FIGURE 3.

According to the invention, a carriage 7 is guided alongside the machine, is spaced a uniform distance therefrom and is provided with a seat 8 for an operator. According to the example of construction shown in FIGURES 1 to 2a, the carriage 7 is guided by means of rails 9 laid in the ground by a guide roller 10 engaging the rails with said guide roller 10 controlling the wheels 11.

Furthermore, the feeler is essentially perpendicular to the thread plane and moves parallel with said plane on the carriage. The feeler can be constructed in various ways even though it fulfills the same function. The feeler shown in FIGURES 1 to 3 will be discussed first, then the feeler shown in FIGURES 11 to 16 and then the feeler shown in FIGURES 19 to 21. At this example of construction shown in FIGURE 3, the feeler 12 is constructed as a rocking lever 13 pivotal about an axis 13a in the bearing block 14. The feeler preferably is made of spring steel wire to provide a high degree of flexibility and minimum weight. The feeler 12 is provided with a part 15 which acts together with a control device 17 which controls the motor driven carriage 7. The control device according to the example of construction of FIGURE 3 comprises an electric switch, preferably a micro switch, which is connected to the control circuit of the electric motor 16 in the carriage 7. The control circuit is constructed so that the current is permitted to flow to the motor 16 when the operating member 18 is in one position operated by the part 15 of the feeler 12, whereas the current to the motor is interrupted when the working member 18 is in the other position, and consequently, the motor is stopped. Furthermore, the motor is preferably constructed as a so-called brake motor, that is, a motor having a mechanically actuated brake which is activated when the current flow to the motor is interrupted.

As shown in FIGURE 3, the feeler 12 can be put into two positions, namely, the operating position indicated by solid lines and the nonoperating position indicated by broken lines. In its operating position, the feeler 12 abuts against the threads 2 and is held in this position by means of the thread tension. The force of the feeler 12 against the threads 2 is applied by means of its own weight and/or by means of an auxiliary force. In the example of construction shown in FIGURE 3, an auxiliary force is produced by the spring 19 in the switch 17 which acts on the operating member 18 and in turn the part 15 of the feeler 12. When the feeler 12 is in the operating position, the current flow to the motor 16 is permitted to flow so that the carriage 7 and the feeler are moved in the direction A. During said movement, the active part 12a of the feeler 12 abutting against the threads 3, is close to the thread plane E—E. If the feeler 12 meets a broken thread during its movement, the feeler is no longer held in the operating position. The spring 19 acting on the working member 18 causes the feeler 12 to be moved across the thread plane E—E into the area provided by the broken thread and thereby into the nonoperating position, indicated in FIGURE 3 by broken lines. In the nonoperating position, the operating member 18 no longer permits the current to flow to the driving motor 16 and, thus, the brake on the carriage is activated to stop the carriage after a predetermined time delay, whereby the movement allowed by the time delay due to a slow acting relay, places the operator in front of the space having a broken thread. In this position, the operator can easily clear the broken thread. After clearing the breakage of the thread, the carriage is started again by means of a suitable switching of a contact on the carriage.

To assure a proper working of the feeler 12, it is necessary that the length L of the part 12a of the feeler 12 abutting against the threads while the carriage 7 is in motion be at least the same as the distance $a$ and is no greater than twice the distance $a$ but is preferably less than twice the distance $a$.

The curvilinear shape of the feeler, according to FIGURE 3, causes a small oscillatory motion in the direction B even if no thread is broken, because of the space existing between two threads. However, the portion 12a of the feeler 12 essentially stays in the thread plane E. The small oscillatory motion in the direction B is not sufficient to move the operating member 18 of the switch 17 to stop the flow of current to the motor. A larger oscillatory motion will occur only if a broken thread forms a space that is greater than the regular distance between two threads, which then will result in the stopping of the driving motor of the carriage 7.

It is only possible to guide the carriage back and forth on very long machines along one side thereof. However, it is preferable to be able to guide the carriage in a circle around at least one machine so that the feeler of said carriage can pass successively along both sides of the machine and feels the threads. However, it is more advantageous to control several machines, for instance, four machines, with one carriage as shown in FIGURE 4. The number of machines to be controlled by the carriage depends on the number of spindles provided at each machine and depends on the frequency of the thread breakages. The carriage can be moved with a speed of about 1 meter per second. Taking into consideration the fact that the carriage is not moving half of the time during clearing of thread breakages and the fact that the carriage moves the other half of the time in one minute, 30 meters of machine length can be controlled.

Figure 6:
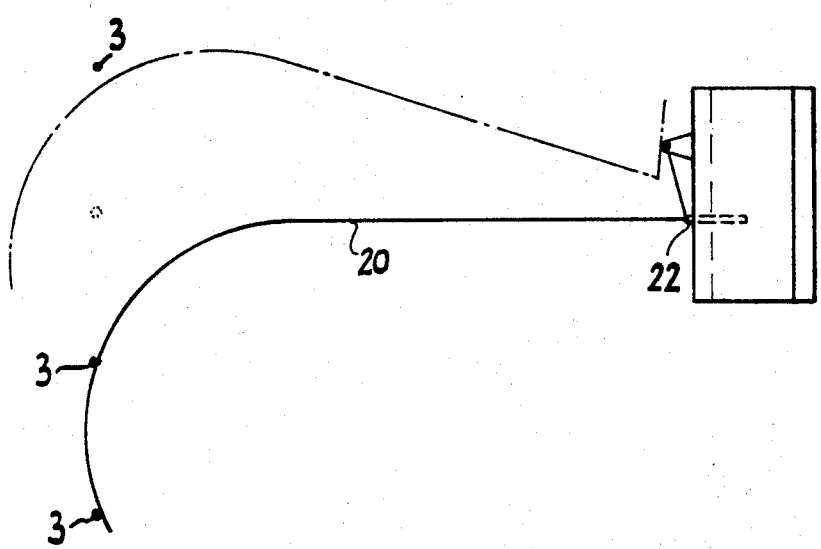

In the example of construction shown in FIGURE 3, the feeler 12 was abutted against the threads 3 by means of the auxiliary force of the spring 19 of the switch 17. As it is illustrated in FIGURES 5 and 6, it is also possible to let the feeler 20 abut against the threads 3 by its own weight. It is necessary that the rocking lever's axis of rotation 21 be inclined upwardly toward the spinning machine, as this is shown in FIGURE 5 so that the rocking lever is perpendicular to the threads 3. As long as the feeler 20 is kept in the operating position by means of the thread tension of non-broken threads, it will keep the electric contact 22 closed to let current flow to the driving motor. Smaller movements of the feeler 20, which are caused by the normal spacing between the threads, can be adjusted by making the feeler of an elastic material. However, if the feeler meets a larger space, resulting from a thread breakage, the feeler will rotate to the broken line nonoperation position (FIGURE 6) by means of its own weight. Thus, the contact 22 is opened and the current flow to the driving motor is interrupted.

FIGURE 7 shows another example of construction of a feeler. The feeler 23 comprises a guide 24 abutting against the threads 3, said guide being pivotally mounted on a bearing block 26 by means of two parallelogram levers 25. The levers 25 are under the pressure of a spring 27 tending to pull the levers to a vertical position. One of the levers is provided with an arm 28 which, in operating position, pushes the operating member 29 toward the switch 30 to activate the control circuit of the motor. In case of thread breakage, the guide 24 enters the space and results in a deviation of the lever 25 in direction C. The operating member 29 is pulled away from the switch 30 to its second switch position and stops the driving motor.

FIGURES 8 and 9 show a further example of construction of a feeler which comprises a guide 31 abutting against the threads and a guide pin 32 connected to the guide and extending essentially perpendicular with respect to the thread plane. The guide pin 32 slides perpendicularly to the thread plane through a box 33 connected to the carriage. The end of the pin 32 opposite the feeler acts together with a switch 34 connected to the control circuit of the driving motor. In case of thread breakage, the guide 31 with the pin 32 moves in direction D (FIGURE 9) by means of its own weight and possibly by means of an additional force created by a spring acting on the operating member of the switch so that the switch will definitely move to its nonoperating position and stop the motor.

In the example of construction shown in FIGURE 10, the driving motor 16 is driven by air pressure furnished by air pressure bottles 35 mounted on the carriage. Said air pressure is directed to a differential piston 36 which at the same time is used as a control piston, said piston 36 is arranged shiftably in a cylindrical housing 37. The differential piston 36 is connected to the feeler 39 by the piston rod 38 to feel the threads as aforesaid. Since the area of the pressure on the underside of the differential piston is larger by the cross section of the piston rod than that acting on the upper side, there is little but some, pressure urging the piston rod in the direction F. Thus, the feeler 39 is pressed against the threads 3 by means of a small amount of air pressure. If the feeler arrives at a space created by a broken thread, the feeler will move into the space due to the excess pressure on the underside of the piston 36. At the same time, air pressure fed to the motor is interrupted since the piston 36 blocks the opening 40 of the line leading to the motor. This device can also be constructed so that the differential pistons do not control the air pressure furnished to the motor directly but indirectly by operating a servo-piston. It would also be possible to provide hydraulic pressure means instead of air.

Furthermore, it may be advantageous to attach the feeler to an arm 42 (FIGURE 11) which is movable toward or away from the machine. In the example of construction described here, a feeler 12 of the first-mentioned construction is used. The arm 42 is arranged on a carrier 44 which is movably positioned on a rod 43. The operator can move the carrier by means of a hand lever 45 which operates a rack 47 and pinion 46. By manipulation of the hand lever 45 in direction G, the carrier 44 and the arm 42 are shifted in direction H toward the machine. The carrier 44 can be moved back by a reversal of the manipulation of hand lever 45. Thus, the feeler abutment against the threads is controlled. When the feeler meets a thread space and the carriage is stopped, the operator operates the hand lever to move the arm away from the machine. The withdrawal of the arm from the machine gets the feeler 12 away from the operating area of the threads and the operator can clear thread breakages or other work as needed. The feeler 12 attached to the arm 42 has a second purpose. When the carriage arrives at the end of the machine, it is advantageous to move the feeler away from the machine so that the feeler does not hit the front surface of the machine projecting in front of the thread plane. If there are other machines, the separating partitions will make it necessary to withdraw the feeler.

So as not to damage the feeler in case the operator should forget to withdraw the arm, it is advantageous to mount the feeler, as it is shown in FIGURES 11 and 12, to a swinging lever 49 which is mounted to the arm 42 about a vertical axis 50 provided at the end of the arm 42, and is kept in the operating position toward a stop 51 by means of a spring (not shown). The swinging lever carries a roller 52 which can work together with corresponding guide rails provided in the front walls and partitions of the machine or can abut directly against the front walls, partitions and other obstacles in its path. The lever 49 and the feeler 12 are swung in the direction K to the nonoperative position.

The carriage 7 can be guided by various means alongside the machine or in a circle around one or more machines. Besides the description of a rail laid in the ground in connection with FIGURES 1–2a, FIGURES 13 and 14 show that a rail 53 can be arranged above the carriage. The rail 53 can be fixed to the top of the machine room or to a support structure connection to the ground. In the example of construction shown in FIGURE 13, the rail 53 is used only for controlling the carriage 7a through the control rod 54. The rail 53 can be constructed to carry current for operating the carriage by having current carrying rails which work together with corresponding collectors 55 provided on the control rod 54.

Furthermore, it is possible also to hang the carriage 7b like a gondola onto a crane carriage 56, which is guided in the rails 57 and which is provided with a driving motor. The carriage 7b is swingably connected through the supporting arm 59 to the crane carriage 56 and is arranged in a way that the center of gravity S of the carriage 7b is positioned horizontally outside the vertical plane parallel to the machine and passing through the pivotal point 60. This permits the carriage 7b to swing in direction L toward the machine. The carriage 7b has on its side facing the machine a first support wheel 61 rotatable about an axis and which runs on a rail 62 connected to the machine. Thus, the carriage passes alongside the machine always spaced the same distance away. The carriage is provided on its underside with a second support wheel 63 rotatable about a horizontal axis. The support wheel 63, as shown in FIGURE 14, is arranged so that it is spaced upwardly from the ground as long as the carriage is supported on the rail 62 by the support wheel 61. However, if the rail 62 ends, for instance in case the carriage moves between two machines or is guided around the front face of the machine, the carriage can move a little in direction L until the second support wheel 63 rests on the ground. Consequently rails need to be provided only along the front side of the machines.

For guiding the carriage, as shown in FIGURES 15 and 16, a current carrying cable 64 is laid in the ground. The pulses sent out on the cable, which pulses, for instance can be of a high frequency type, energize a suitable receiver 65 carried in the carriage 7c, which said receiver 65 in turn operates the control system of the carriage 7c. Such a control of the carriage has the advantage that no rails are provided where dust and fiber dust can be collected which could be the source of an accident in the machine room. However, if the carriage, used with the current carrying cable and the receiver 65, is not guided alongside the machine at a sufficiently constant distance, it is advantageous to provide on the carriage 7c an element 69 which is movable toward the machine by the force of a spring 68, which carries a feeler 12 and which is guided by a guide roller 70 bearing on a guiderail 71 provided adjacent the machine. If the distance between the carriage 7c and the side of the machine changes during movement of the carriage, the element 69 will swing more or less as required to follow the rail 71. The feeler, however, is guided along the machine at constant distance from the threads because the position of the feeler 12 is determined by the rail 71 fastened to the machine.

Instead of a swinging lever, the element can be also constructed telescopically or otherwise collapsible nature. Such a construction is shown in FIGURES 17 and 18. The lazy-tongs element 72 consists of several scissor members 73 being connected flexibly with each other (as the Nurnberger scissors), the first of which carries the feeler 74 and the support roller 75, while the other end of the member 73 is connected to the carriage. As in the aforesaid example of construction, the support roller 75 is supported by a rail 76 provided alongside the machine. By means of a spring 77, the element 72 is moved toward the machine until the support roller 75 comes to rest against the rail 76. For collapsing the lazy-tongs element, an operating lever 78 is provided with which one end of the spring 77 is connected through the arm 79. The operating lever 78 is mounted pivotally at its lower end 78a. A second spring 80 engages the operating lever 78 as a counterbalance. The operating lever, furthermore, is provided with a second arm 81 which acts together with a pin 82 at the last scissor member. As the operating lever 78 is swung upwardly, the arm 81 bears against the bolt 82, through which the lazy tongs is collapsed. At the same time the spring 77 is tensioned. For extension of the lazy tongs, the operating lever is pushed downwardly whereby the arm 81 frees the pin 82 and the lazy tongs are extended in response to the spring 77.

The examples of construction shown in FIGURES 17 and 18 show the carriage 7d having two pairs of lazy-tongs elements 72 and 72' extending perpendicularly to the direction of movement of the carriage 7d and being extendable toward opposite sides thereof. Since the construction of the lazy tongs 72' is the same as the construction of the lazy tongs 72, a detailed description is not necessary. A carriage with two pairs of lazy tongs or elements extending in opposite directions can be used advantageously in cases where the distance between two adjacent machines is comparatively small, that is, if the path provided between two machines is small. An operator, for instance, can then extend the two pairs of lazy tongs 72 and 72' outwardly on both sides so that two machines at the same time can be controlled. The above-described device can also be used to control only one machine by providing only one pair of lazy tongs or by putting the second pair of lazy tongs out of operation.

Since the carriage is continuously guided around the machine or machines, said carriage can be provided advantageously with a driving blast or suction device for cleaning the machine and the floor. Such a carriage carrying a blast and suction device is shown in FIGURES 19 to 21. The carriage 7c is provided with a motor 84 driving blower 85 beneath the seat 83 of the operator. Blast channels 86 and 87 are connected to said blower. The blast channel 86 has a blast nozzle 89 at its end extending inclined downwardly toward the floor, while the blast channel 87 extends upward at least to the height of the drawing system of the machine or, as it is shown in the drawings, it may extend even higher. Said vertical blast channel 90 is provided with several blast nozzles 91 arranged on top of each other and extending outwardly in the direction of the machine. On the other side of the carriage, two suction channels 92 and 93 are provided, said suction channels opening up into a filter box 94 having a filter 95 therein arranged beneath the seat 83. The filter box can be made accessible for cleaning purposes by a door 96. The suction channel 92 connected to suction nozzles 97 which suck the fiber dust off the spindle bank, the ring rail and the spindles. Furthermore, the suction channel 93 is connected with a suction nozzle 98, which is directed toward the floor and which picks up the fiber dust therefrom. By means of blast nozzles 89 and 91, the particles of dust and fiber dust are blown off the machine and then by means of suction nozzle 98 are taken up again at the next passing of the carriage 7d. Thus, the machine is cleaned each time the carriage passes so that if desired, separate cleaning devices can be omitted.

The embodiments of the invention in which an exclusive property or privilege is claimed are defined as follows:

1. Device for indicating broken threads in textile machines, comprising a twisting frame wherein a plurality of spaced threads are arranged in a substantially vertical plane extending along at least one side of the twisting frame, characterized by the fact that the device comprises a carriage operated by a motor for continuous movement over rails surrounding the twisting frame, a feeler supported by the carriage adapted to contact the threads during motion of the carriage, the portion of the feeler contacting the threads during movement of the carriage having a length at least equal to the spacing between the adjacent threads, spring means adapted to press the feeler towards the threads causing it to take a first operative position wherein the feeler is tangential to the said plane of the threads when the threads are sound or, alternatively, a further operative position wherein the feeler is situated beyond the said plane when on movement of the carriage the feeler loses its support owing to breakage of a thread, and an electric circuit controlling supply of electric current to the motor, operated by the feeler to supply current to the motor when the feeler is in its first-mentioned position, and cut off the current supply to the motor when the feeler is in its second-mentioned position, whereby the carriage is stopped, the carriage being provided with a stand for an operator knotting the ends of broken threads.

2. A device as defined in claim 1, wherein said electrical circuit includes a normally open switch mounted on said carriage with said switch being contacted by said feeler and moved to the closed position so as to energize said motor whenever said feeler is maintained in said first operative position, movement of said feeler to said further operative position causing said switch to return to its normally open position whereupon the current supply to said motor is interrupted.

3. An apparatus for indicating broken threads in textile machines, said machine having a plurality of adjacently running threads positioned in a common plane, comprising in combination:

a carriage and means mounted on said carriage adapted for carrying an operator thereon;

guide means for guiding the movement of said carriage alongside of the machine in a direction substantially parallel to said plane, said guide means permitting said carriage to continuously travel completely around at least one of said machines;

means including a motor for moving said carriage under the control of an operator along said guide means;

sensing means bearing against said threads and mounted on said carriage for movement with respect thereto in a direction substantially perpendicularly to said plane, said sensing means being subjected to a continuous tension force and thereby urged continuously away from said carriage in a direction toward said plane, whereby said sensing means is normally held against said threads;

said sensing means including a lever pivotably mounted on said carriage and a contact portion connected to and movable with said lever for contacting said threads, said contact portion being substantially parallel to the plane of said threads and having a length at least equal to the spacing between said threads but not exceeding twice said spacing, said sensing means further including means for urging said lever continuously outwardly away from said carriage toward said plane;

control means responsive to operation of said sensing means for affecting operation of said motor so long as said sensing means remains substantially in said plane and for stopping said motor and said carriage when said sensing means by reasons of meeting a broken thread responds to said tension force to move beyond said plane;

said control means including a switch normally spring urged into an open position, said switch being arranged with respect to said lever so that when the contact portion of said sensing means is in contact with an unbroken thread, said lever will contact said switch and hold same in a closed position and when said sensing means encounters a broken thread, said lever and said contact portion will move outwardly away from said carriage past said plane whereby said switch will respond to the spring therein for returning said switch to its normal open position, said control means further including circuitry means connecting said switch to said motor so that said motor is operated when said switch is in the closed position and said motor is stopped when the switch is in the open position.

4. An apparatus as defined in claim 3, wherein said means urging said lever outwardly toward said plane includes spring means.

5. An apparatus as defined in claim 3, wherein said lever is made from a resilient spring-like material and said contact portion constitutes an integral portion of said lever.

6. An apparatus as defined in claim 3, wherein said sensing means includes a second lever pivotally mounted on said carriage in substantially parallel relationship to said first-mentioned lever, and said contact portion comprising a guide shoe pivotably interconnected to both of said levers adjacent the free end thereof so as to form a substantially parallelogram linkage, said guide shoe being substantially parallel to said plane and being held in engagement with the threads forming said plane.

7. An apparatus for indicating broken threads in textile machines, said machine having a plurality of adjacently running threads positioned in a common plane, comprising in combination:

a carriage and means mounted on said carriage adapted for carrying an operator thereon;

guide means for guiding the movement of said carriage alongside of the machine in a direction substantially parallel to said plane, said guide means permitting said carriage to continuously travel completely around at least one of said machines;

means including a motor for moving said carriage under the control of an operator along said guide means;

sensing means bearing against said threads and mounted on said carriage for movement with respect thereto in a direction substantially perpendicularly to said plane, said sensing means being subjected to a continuous tension force and thereby urged continuously away from said carriage in a direction toward said plane, whereby said sensing means is normally held against said threads;

said sensing means further including a guide shoe arranged for lying against said threads and a guide rod fixedly secured to said guide shoe and extending outwardly therefrom in a direction substantially perpendicular to said thread plane, said sensing means further including bearing means on said carriage mounting said rod for linear movement in said direction substantially perpendicular to said thread plane;

control means responsive to operation of said sensing means for affecting operation of said motor so long as said sensing means remains substantially in said plane and for stopping said motor and said carriage when said sensing means by reasons of meeting a broken thread responds to said tension force to move beyond said plane;

said control means including a switch normally spring urged into an open position, said switch being arranged with respect to said guide rod so that when the contact portion of said sensing means is in contact with an unbroken thread, said guide rod will contact said switch and hold same in a closed position and when said sensing means meets a broken thread, said guide rod and said contact portion will move outwardly away from said carriage whereby said switch will respond to the spring therein for returning said switch to its normal open position, said control device further including circuitry means connecting said switch to said motor so that said motor is operated when said switch is in the closed position and said motor is stopped when the switch is in the open position.

8. The device defined in claim 3 including a carrier interposed between said carriage and said sensing means and means independently mounting said carrier for movement with respect to said carriage toward and away from said threads, whereby said sensing means may be moved away from said threads independently of movement of said carriage.

9. The device defined in claim 8 wherein rack and pinion means are provided for mounting said carrier onto said carriage.

10. The device defined in claim 8 wherein the sensing means is arranged on a pivot arm which is in turn arranged pivotally around vertical axis means provided on the end of the carrier and is held by spring pressure in its working position.

11. The device defined in claim 3 including overhead guide means for guiding said carriage and hanger means suspending said carriage therefrom;

a first guide roller and means mounting same onto said carriage for rotation around a vertical axis and a guide rail arranged along said machine for cooperation with said first guide roller;

a second guide roller and means mounting same for rotation around a horizontal axis and normally spaced slightly from said floor, the hanger means being normally held by said first roller at a sufficient angle that said second roller is spaced from said floor but when said guide rail is discontinued between machines said carriage will swing on said hanger and be supported on the floor by said second guide roller.

12. The device defined in claim 3 including also an electric cable embedded into the floor adjacent said machine and means of applying intermittent pulses thereto, and guide means on said carriage responsive to said pulses for guiding said carriage along and in a predetermined relationship with said cable.

13. The device defined in claim 12 including:

a guide rail on the machine and a carrier mounted on said carriage;

guide means on said carrier constantly guided against said guide rail, said sensing means being mounted on said carrier and thereby running at a constant spacing from said plane regardless of minor variations in the spacing of said carriage from said plane.

14. The device defined in claim 12 including:

a guide rail on the machine and a carrier including lazy-tongs means mounted on said carriage constantly guided against said guide rail, said sensing means being mounted on said carrier and thereby running at a constant spacing from said plane regardless of minor variations in the spacing of said carriage from said plane;

a manually operable lever for effecting clasping of said lazy-tongs device and withdrawal of same from said guide rail and resilient means constantly urging said guide means against said guide rail which resilient means is automatically tensioned by withdrawal of said guide means from said guide rail.

15. The device defined in claim 12 wherein there is provided a pair of machines spaced from each other, guide rails along the facing portions of said machine, means between said machine for guiding said carriage therebetween and carrier members with sensing means associated therewith extending in opposite direction from a single carriage for simultaneously supervising said two machines.

16. The device defined in claim 3 wherein said carriage has suction ports arranged at least adjacent the floor and blower ports directed both toward the machine and toward the floor and including also blower means and filter means connectible to said ports.

References Cited

UNITED STATES PATENTS

| | | | |
|---|---|---|---|
| Re. 26,230 | 6/1967 | Escursell-Prat | 57—34 |
| 1,641,658 | 9/1927 | Berglund | 200—61.18 |
| 1,725,469 | 8/1929 | Millinger et al. | 200—61.18 |
| 1,735,102 | 11/1929 | Arragg | 57—81 |
| 1,747,991 | 2/1930 | Simpson | 139—282 |
| 2,003,353 | 6/1935 | Fantone et al. | 57—19 |
| 2,221,869 | 11/1940 | Halin | 57—86 |
| 3,042,328 | 7/1962 | Mahoney | 242—35.6 |
| 3,262,180 | 7/1966 | Findlow | 57—81 XR |
| 3,128,590 | 4/1964 | Escursell-Prat | 57—34 |

FOREIGN PATENTS

| | | |
|---|---|---|
| 591,719 | 4/1959 | Italy. |
| 942,791 | 11/1963 | Great Britain. |
| 1,059,897 | 11/1953 | France. |
| 1,149,186 | 12/1957 | France. |

OTHER REFERENCES

"The Cooksey System" bulletin by the "Korth Engineering Co., copy and received in Group 216 on Jan. 14, 1965, 200/61.18.

FRANK J. COHEN, *Primary Examiner.*

W. SCHROEDER, *Assistant Examiner.*